United States Patent
Williams et al.

(10) Patent No.: US 7,636,803 B2
(45) Date of Patent: Dec. 22, 2009

(54) DEVICE AND METHOD FOR TRANSFERRING DATA BETWEEN DEVICES

(75) Inventors: Wade L. Williams, Austin, TX (US); Philip E. Madrid, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 132 days.

(21) Appl. No.: 11/528,947

(22) Filed: Sep. 28, 2006

(65) Prior Publication Data
US 2008/0147914 A1 Jun. 19, 2008

(51) Int. Cl.
*G06F 3/00* (2006.01)
*G06F 5/00* (2006.01)

(52) U.S. Cl. ............... 710/52; 710/57; 710/59

(58) Field of Classification Search ........ 710/52
See application file for complete search history.

(56) References Cited

U.S. PATENT DOCUMENTS

| | | | |
|---|---|---|---|
| 4,590,602 A | 5/1986 | Wolaver | |
| 4,600,895 A | 7/1986 | Landsman | |
| 4,758,945 A | 7/1988 | Remedi | |
| 5,151,986 A | 9/1992 | Langan et al. | |
| 5,233,316 A | 8/1993 | Yamada et al. | |
| 5,268,656 A | 12/1993 | Muscavage | |
| 5,291,070 A | 3/1994 | Witt | |
| 5,586,308 A | 12/1996 | Hawkins et al. | |
| 5,828,869 A | 10/1998 | Johnson et al. | |
| 6,157,265 A | 12/2000 | Hanjani | |
| 6,281,721 B1 | 8/2001 | Kinget et al. | |
| 6,281,759 B1 | 8/2001 | Coffey et al. | |
| 6,316,982 B1 | 11/2001 | Gutierrez, Jr. | |
| 6,385,126 B2 | 5/2002 | Jung et al. | |
| 6,411,135 B2 | 6/2002 | Komoto | |
| 6,694,389 B2 * | 2/2004 | Coates et al. | 710/52 |
| 6,715,094 B2 | 3/2004 | Jacobs | |
| 6,983,354 B2 * | 1/2006 | Jeddeloh | 711/167 |
| 7,319,345 B2 | 1/2008 | Farad-rad et al. | |
| 2002/0140486 A1 | 10/2002 | Boerstler et al. | |
| 2004/0119521 A1 | 6/2004 | Kurd et al. | |
| 2008/0094117 A1 | 4/2008 | Stoler et al. | |

OTHER PUBLICATIONS

Chakraborty et al., "Efficient Self-Timed Interfaces for Crossing Clock Domains," Proceedings of the 9th International Symposium on Asynchronous Circuits and Systems, IEEE 2003, pp. 1-11.

Chelcea et al., "A Low-Latency FiIFO for Mixed-Clock Systems," Department of Computer Science, Columbia University. 8 pages, 2000.

(Continued)

*Primary Examiner*—Alford W Kindred
*Assistant Examiner*—Zachary K Huson

(57) ABSTRACT

A device and method for transferring data is disclosed that facilitates data transfers between devices having different clock domains. The data transfer from one device to another occurs through a First In First Out memory (FIFO). The relative number of FIFO access cycles to the FIFO is controlled to maintain a desired FIFO fullness. Setting the desired FIFO fullness to a desired value allows control of data transfer latency between devices.

19 Claims, 9 Drawing Sheets

OTHER PUBLICATIONS

Chelcea et al., "Robust Interfaces for Mixed-Timing Systems," IEEE Transactions on Very Large Scale Integration (VLSI) Systems, vol. 12, No. 8, Aug. 2004, p. 857-873.

Messerschmitt, David G., "Synchronization in Digital System Design," IEEE Journal on Selected Areas in Communications, vol. 8, No. 8, Oct. 1990, pp. 1404-1419.

Seizovic, Jakov N., "Pipeline Synchronization," Myricom, Inc., 0-8186-6210-7/94, IEEE 1994, pp. 87-96.

Actions on the Merits by the U.S.P.T.O. as of May 26, 2009, 1 page.

PCT International Search Report for PCT/2008/006342, 3 pages.

* cited by examiner

DEVICE AND METHOD FOR TRANSFERRING DATA BETWEEN DEVICES

CROSS-REFERENCE TO RELATED APPLICATIONS

The present application is related to co-pending U.S. patent application Ser. No. 11/750,267 entitled "TECHNIQUES FOR INTEGRATED CIRCUIT CLOCK MANAGEMENT" filed on May 17, 2007 U.S. patent application Ser. No. 11/750,284, entitled "TECHNIQUES FOR INTEGRATED CIRCUIT CLOCK MANAGEMENT USING PULSE SKIPPING" filed on May 17, 2007, U.S. patent application Ser. No. 11/750,290, entitled "TECHNIQUES FOR INTEGRATED CIRCUIT CLOCK MANAGEMENT USING MULTIPLE CLOCK GENERATORS" filed on May 17, 2007, U.S. patent application Ser. No. 11/750,275, entitled "TECHNIQUES FOR INTEGRATED CIRCUIT CLOCK SIGNAL MANIPULATION TO FACILITATE FUNCTION AND SPEED TEST" filed on May 17, 2007, and U.S. patent application Ser. No. 12/409,228, entitled "DIGITAL FREQUENCY SYNTHESIZER DEVICE AND METHODS THEREOF" filed on Mar. 23, 2009 all of which are incorporated herein by reference in their entirety.

FIELD OF THE DISCLOSURE

The present disclosure relates generally to the transfer of digital information in a data processing device and more particularly to the transfer of digital information between different clock domains.

DESCRIPTION OF THE RELATED ART

One method of transferring data between devices having different clock domains has been accomplished using latches and gear ratio circuits to quickly and predictably get between clock domains. While this solution is simple, it generally requires a clock period that is near an order of magnitude larger than the drift of the Phase-Locked Loop (PLL) generating the clock period to ensure that one clock domain does drift too far ahead or behind the other clock domain. However, as clock speeds continue to increase, the inherent drift of the PLL can exceed the clock period, thus rendering this design approach ineffective.

Another method of transferring data between devices having different clock domains uses a First In First Out memory (FIFO) that can be accessed until it is full or empty at which time writing and receiving devices, respectively, are prevented from accessing the device. While this technique is effective in preventing data loss between devices having different clock domains, it can result in poor latency performance between when data is sent by writing device and received by a reading device. Therefore, a system and method of transferring data between devices having different clock domains at a lower latency level would be useful.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A device and method of data transfer is disclosed herein to facilitate data transfers between devices having different clock domains. The data transfer from one device to another occurs through a FIFO. The relative number of FIFO access cycles to the FIFO is controlled to maintain a desired FIFO fullness. Setting the desired FIFO fullness to a desired value allows control of data transfer latency between devices. The present disclosure will be better understood with reference to FIGS. 1-10 herein.

Figure 1:
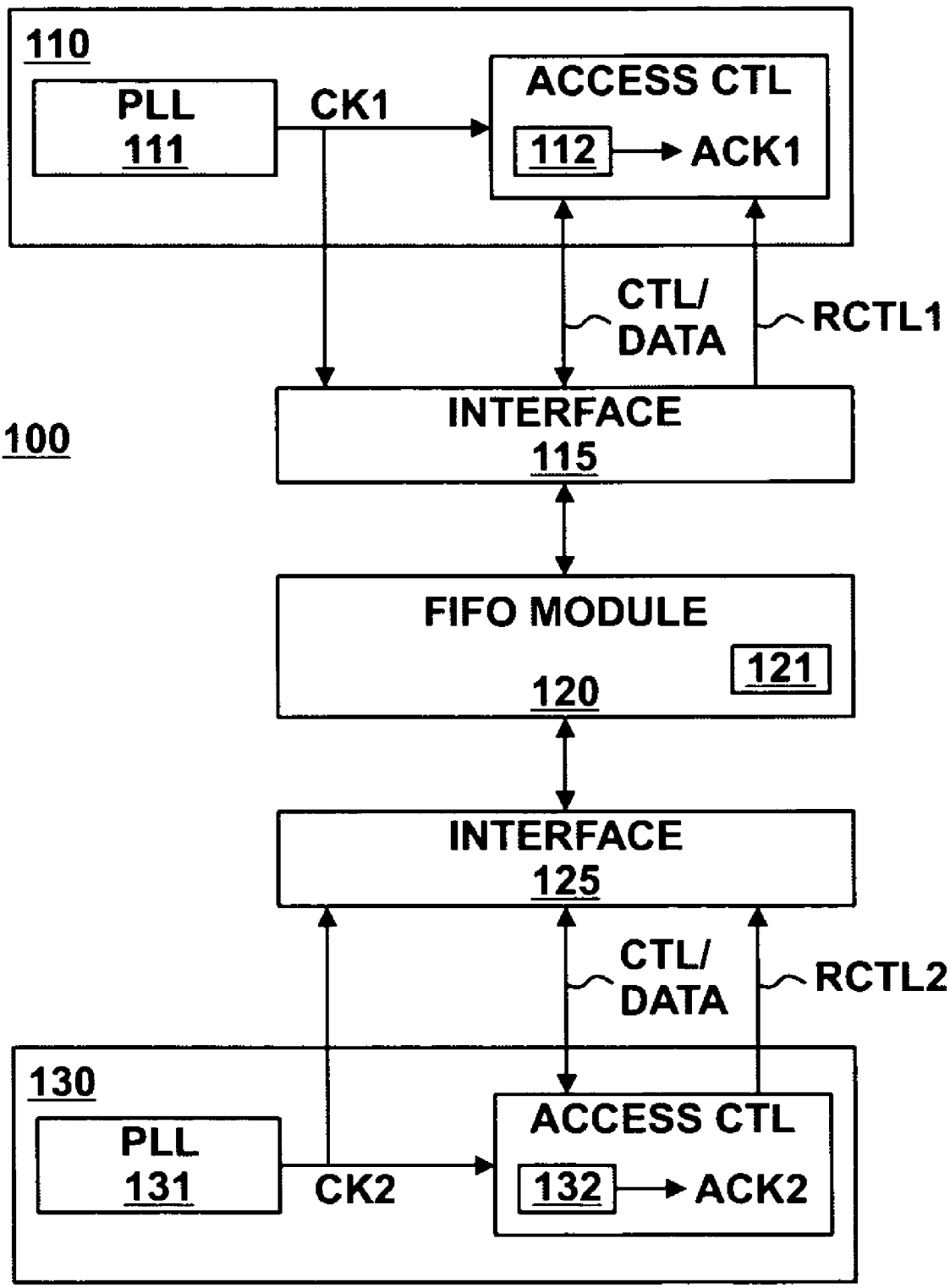
FIG. 1 illustrates in block diagram form devices that are part of a larger device in accordance with a specific embodiment of the present disclosure.

FIG. 1 illustrates a system device 100 comprising a device 110, interface module 115, FIFO module 120, interface module 125, and device 130. Interface module 115 is connected to device 110 and to FIFO module 120. Interface module 125 is connected to device 130 and FIFO module 120. In one embodiment, system device 100 represents a system on a chip (SOC) whereby the illustrated components are fabricated at a common substrate. In another embodiment, one or more of the components illustrated in FIG. 1 can be separate components.

In one embodiment, device 110 and device 130 each generate an access clock having a periodic signal that is used to control their respective data accesses to FIFO module 120. The access clock of device 110 is labeled CK1 while the access clock of device 130 is labeled CK2. CK1 and CK2 represent periodic signals of different clock domains and can be asynchronous to each other.

In one embodiment the clock domains are mesochronous where the two clock domains run at the same nominal frequency but with an unknown phase relationship. In another embodiment the clock domains are plesiochronous, whereby the clock domains are nominally running at the same frequency but there may be a constant drift between the two domains, such as can be caused by the two clock domains being sourced from different oscillators. In another embodiment the clocks can be heterochronous, whereby the frequencies can be different from each other but are fundamentally related by a ratio of integers.

The term "frequency difference" as used herein with respect to access clocks CK1 and CK2 refers to a difference in their respective frequencies. The term "frequency" as used with respect to access signals ACK1 and ACK2 refers to the number corresponding access clock cycles reproduced at the access signal over a period of time. A frequency difference between CK1 and CK2, and therefore between signals ACK1 and ACK2, can be the result of frequency mismatch and frequency drift. The term "frequency mismatch" is used herein to refer to a frequency difference between two clocks that is attributed to the frequency of their respective base clocks and any defined values used to set the frequency of the two clocks. Examples of defined values for a clock would include circuitry or register values used to multiply/divide its base clock. For example, circuitry or register values used to generate a reference clock used by a phase-locked loop (PLL) to generate a clock signal, or to otherwise control a frequency of a clock generated by the PLL, are specific examples of defined values that are used to set the frequency of a clock signal. The term "frequency drift" is used herein to refer to variations in a signal or between signals that occur over time. For example, frequency drift or a signal can be caused over time by the frequency of its base clock changing or due to the occurrence of PLL drift at a PLL used to generate the signal. The term "FIFO access cycle" refers to a period of time during which signal transitions can be asserted to allow a device to access a FIFO. For example, a FIFO access cycle at device 110 can correspond to one or more periods of access clock CK1. A FIFO access cycle at device 130 can correspond to one or more periods of access clock CK2. For purposes of discussion herein, a specific embodiment is discussed whereby a FIFO device can be accessed during a FIFO access cycle that corresponds to a single clock period. For example, each clock period of CK1 corresponds to a FIFO access cycle that can be asserted, e.g. reproduced, at an access signal that is available by a device, thereby allowing it to access the FIFO device. Therefore, the number of FIFO access cycles at an access signal that are actually asserted, and thereby available to the a device, can be less than the number of FIFO access cycles present at the device's access clock. Therefore, the signals ACK1 and ACK2 in FIG. 1 are referred to herein as FIFO access signals, and are control signals available to their respective devices to provide control information corresponding to their access clocks, CK1 and CK2, to allow their respective devices to access to the FIFO.

The FIFO module 120 includes one or more FIFO devices (not shown) and storage locations 121 to facilitate the transfer of data between device 110 and device 120. In one embodiment, storage locations 121 are registers that store information specific to the FIFO devices, such as head and tail pointers associated with a circular buffer used to implement an individual FIFO device. The FIFO devices of FIFO module 120 can include dynamic memory elements or static memory elements. When the FIFO is formed from dynamic memory elements the FIFO module 120 can have its own clock domain that is different from the clock domains of devices 110 and 130. Alternatively, FIFO module 120 can operate within the clock domain of device 110 or device 130. For purposes of discussion herein, it is assumed that the memory elements of FIFO module 120 are static memory elements.

The FIFO devices of FIFO module 120 can be formed using single ported memory devices or multi-ported memory device, so long as the device used can be accessed sufficiently fast to transfer a desired amount of data. For purposes of discussion herein, it is assumed that each transmit path through the FIFO module 120 has a dedicated FIFO device associated therewith. For example, two transmit paths are needed to support bidirectional transfers between device 120 and device 130. Therefore, FIFO module 120 would include two FIFO devices, whereby one of the two FIFO devices will support data transfers from device 110 to device 130, while the other FIFO device will support data transfers from device 130 to device 110.

In operation, interface module 115 and interface module 125 are control modules that facilitate the transfer of data between devices 110 and 130 through FIFO module 120. Interfaces 115 and 125 include synchronization modules which during operation are used to synchronize communication to FIFO module 120, provide access rate control information labeled RCTL1 and RCT2 to devices 110 and 130, respectively, and to update head and tail pointers of the FIFO devices at FIFO module 120.

In accordance with a specific embodiment, interface module 115 is at least partially within the clock domain of device 110, and can generate a faster clock from CK1 as needed. Interface module 115 can also be partially within the clock domain of the FIFO module 120 when FIFO module 120 has its own clock domain. Interface module 115 can be integrated as part of device 110 or FIFO module 120. Similarly, interface module 125 is at least partially within the clock domain of device 130, and can generate a faster clock from CK2 as needed. Interface module 125 can also be partially within the clock domain of the FIFO module 120 when FIFO module 120 has its own clock domain. Interface module 125 can be integrated as part of device 130 or FIFO module 120. Note that the FIFO module can also reside within either the clock domain of CK1 or CK2. For example, the FIFO module 120 can reside within the clock domain having the faster clock signal.

The term "FIFO fullness" and its variants as used herein refers to the number of entries within a FIFO that are available to be read. The fullness of a FIFO device can be determined by comparing the head and tail pointers of a FIFO device. In accordance with a specific embodiment, a desired fullness of a FIFO device of the FIFO module 120 during a data transfer is known. For example, the desired fullness for a FIFO device can indicate a range of FIFO entries that includes on or more values indicating a specific number of FIFO entries. For example, one embodiment can use a specific value, such as 2, to indicate a desired fullness range of the FIFO device. Another embodiment can use a plurality of values, such as 2-4, to indicate a desired fullness range of the FIFO device. Alternatively, a desired fullness of a FIFO device can be pre-set in a non-volatile manner. The desired fullness of a FIFO device can be determined based on specific design implementation or by reading a programmable location.

In one embodiment, during operation, device 110 writes to a FIFO device of module 120 and will write enough data at the start of a data transfer to achieve the desired fullness at the FIFO device. For example, two sets of data can be written to the FIFO device to achieve the desired FIFO fullness of 2 at the start of a data transfer. The device 130 then reads from the FIFO device through interface module 125 once it is determined that the desired fullness of the FIFO device has been achieved. For example, the interface module 125 can monitor the head and tail pointers of the FIFO device being accessed to determine the FIFO device's fullness and assert an appropriate control signal to notify device 130 once the desired fullness is met.

During data transfer, assuming the number of available access cycles at devices 110 and 130 are the same, device 110 will write data to the FIFO device at the same rate that device 130 reads data therefrom. Therefore, assuming jitter between clock domains and access signals does not affect head and tail pointer values as they are read by the interface modules 115 and 125, the desired fullness of 2 can be maintained at the FIFO device since device 130 reads one entry from the FIFO device for each entry written to the FIFO device by device 110. Therefore, the latency when data is transmitted to the FIFO module 120 for device 130 and when the data actually read by device 130 can be controlled by setting the desired fullness of the FIFO device to an appropriate value. This is an advantage over prior methods that allowed the latency to vary from a small value, when the FIFO was near empty, to a large value, when the FIFO was near full.

It will be appreciated that while an expected number of available access cycles at devices 110 and 130 can theoretically be the same, e.g., the frequency of access clocks CK1 and CK2, the actual number of available access cycles is likely to differ due to frequency mismatch of clocks CK1 and CK2, as well as due to frequency drift between different clock domains. A frequency difference between clock domains can be detected herein by determining that the current fullness of the FIFO device is outside a desired fullness range of the FIFO device. For example, if the fullness of the FIFO device is below its desired fullness range, e.g., less than 2, it can be determined that a frequency of read accesses is greater than a frequency of write accesses, and a read access cycle of the access clock (e.g., CK2) that will otherwise have a corresponding access cycles at the access signal (ACK2) can be identified for removal (subtracted) from the access signal (ACK2). By removing a cycle from the read access signal (e.g., ACK2) the number of actual read access cycles available to a device (e.g., device 110) to access the FIFO device relative to the number of actual write access cycles available to the other device (e.g., device 130) can be reduced, thereby allowing the fullness of the FIFO device to increase. Similarly, in response to determining that the current fullness of the FIFO device is above its desired fullness range, e.g. 2, it can be determined that a frequency of write accesses is greater than a frequency of read accesses, and a write access cycle of the access clock (e.g., CK1), which will otherwise have a corresponding access cycles at the access signal (ACK2), can be identified for removal (subtracted) from the access signal (ACK1). By removing an access cycle from ACK1, the available set of asserted write cycles at ACK1 is reduced relative the available number of asserted read cycles, thereby allowing the fullness of the FIFO device to be reduced.

As mentioned previously, the asynchronous nature of the two clock systems can result in jitter that will cause a fullness value to be read by one of interface module 115 or interface module 125 that is errant. The interface modules 115 and 125 can compensate for anticipated dithering using a filtering technique. For example, the fullness of a FIFO can be determined to have changed only when two consecutive readings indicate a change of fullness in a common direction. For example, if three consecutive fullness values of a FIFO device are 2-2-1, it would be determined that the current fullness is 2, since only one of the last two consecutive readings indicated a reduction of FIFO fullness. However, if the next reading is also a 1, the three most recent consecutive fullness readings would be 21-1, allowing a determination that the current fullness is 1. Filtering in this manner can allows for determining fullness in a manner that compensates for dithering introduced by differences in clock rates.

In one embodiment, the expected numbers of access cycles at CK1 and CK2 are not the same due to an expected frequency mismatch. In such a scenario, a portion of the access cycles of the faster device's access clock (e.g., CK1) can be suppressed to provide an access signal (e.g., ACK1) having the same number of asserted access cycles as the other device's access clock. The term "suppress" and its variants as used herein refers to identifying or removing access cycles of an access signal (e.g., ACK1) due to a frequency mismatch. Therefore, a portion of the CK1 clock periods can be identified for suppression from access signal CK1. For example, an access clock cycle of CK1 can be suppressed at ACK1 by asserting control logic to maintain a negated logic value at ACK1 during a time period that corresponds to the assertion of the access clock cycle at CK1.

Assuming that device 130, the read device, is faster than device 110, the write device, and that device 130 has an access signal having a portion of its corresponding access clock's cycles suppressed, determining that a FIFO device's fullness is below a desired fullness will result in an available read access cycle being removed (subtracted) from the set of available read access cycles at the access signal. In other words, one of the read access cycles at signal ACK2 that would otherwise be asserted will be negated. By negating an access cycle it is removed from the set of total available asserted read cycles allowing the number of read cycles that can access the FIFO device, relative to the number of write cycles performed at the FIFO device, to be reduced, thereby allowing the fullness of the FIFO device to increase. Similarly, determining that a FIFO device's fullness is above a desired fullness will result in an asserted read access cycle being added to the set of available read access cycles at the access signal. In other words, one of the read access cycles identified for suppression, i.e., an access cycle that would otherwise be suppressed at ACK2, will be asserted, thereby allowing a corresponding read access cycle at signal ACK2 to be generated. By adding an access cycle to the set of total available read cycles the number of read cycles performed at the FIFO device relative to the number of write cycles performed at the FIFO device is increased, thereby allowing the fullness of the FIFO device to decrease.

Assuming that device 110, the write device, is faster than device 130, the read device, and assuming that device 110 has an access signal having a portion of its access clock's corresponding cycles suppressed, a determination that a FIFO device's fullness is below a desired fullness will result in an asserted read access cycle being added to the set of available read access cycles at the access signal ACK1. The number of read cycles performed at the FIFO device relative to the number of write cycles performed at the FIFO device is reduced by adding an access cycle to the set of total available write cycles, thereby allowing the fullness of the FIFO device to increase. Similarly, determining that a FIFO device's fullness in this embodiment is above a desired fullness will result in an available write access cycle being removed (subtracted) from the set of available write access cycles made available to at the write access signal. By subtracting a write access cycle from the set of total available write cycles, the number of write cycles performed at the FIFO device relative to the number of write cycles performed at the FIFO device is reduced, thereby allowing the fullness of the FIFO device to decrease. In this manner, detected frequency differences can be compensated for while maintaining a low latency between when data is sent to the FIFO module 120 from a source device and when data is received at the target device.

Figure 2:
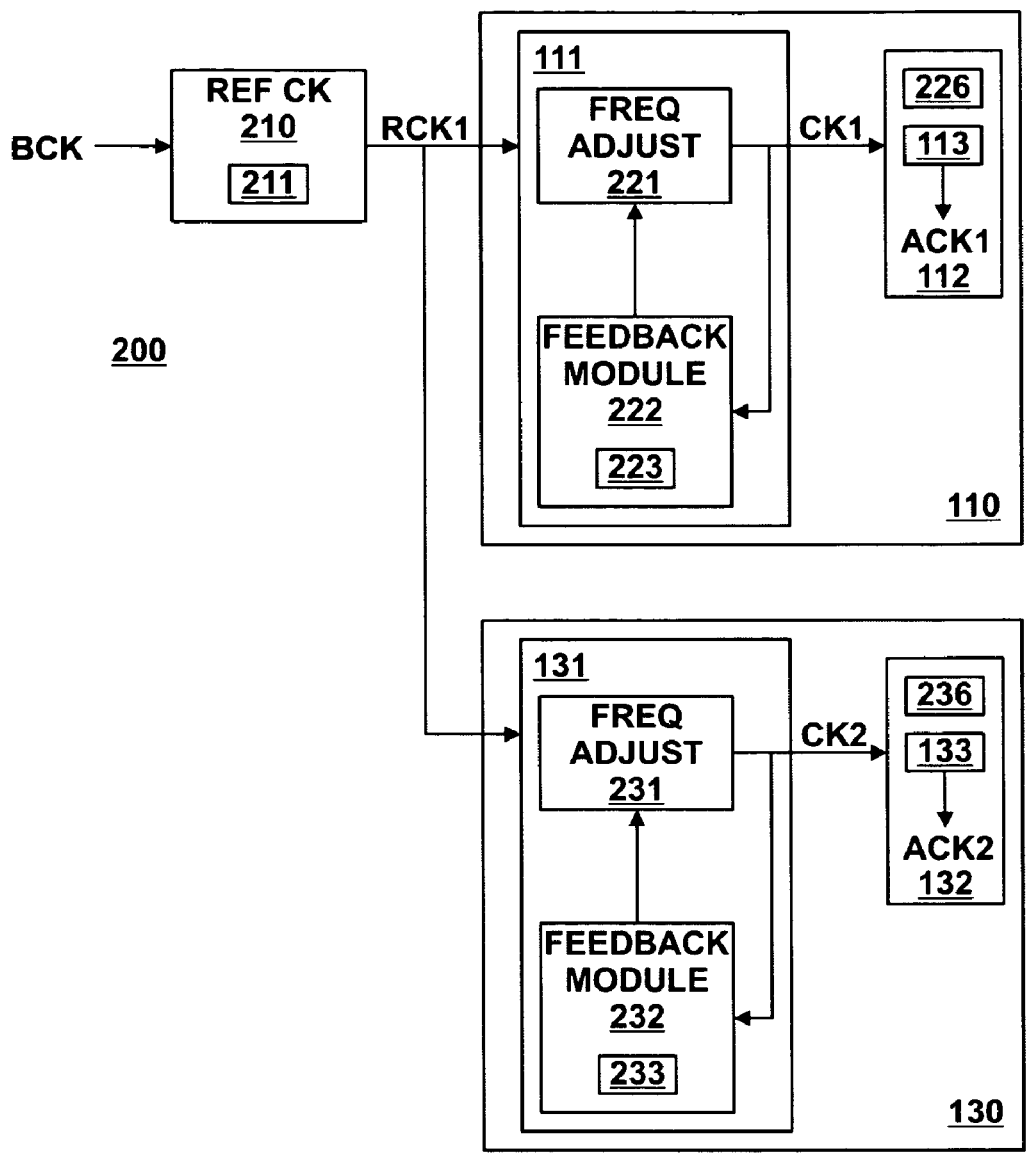
FIG. 2 illustrates in block diagram form a portion of the devices of FIG. 1 being driven by a clock reference signal in accordance with a specific embodiment of the present disclosure.

FIG. 2 illustrates a specific embodiment of a system 200 illustrating in greater detail devices 110 and 130, and further illustrating a reference clock module 210 that receives a base clock, labeled BCK, from which it generates and provides a reference clock, labeled RCK, to PLL 111 of device 110 and to PLL 131 of device 130. The frequency of base clock BCK can be set by an oscillation device such as a crystal. The frequency mismatch between devices 110 and 130 due to reference clock variations in the embodiment of FIG. 2 will be zero since that both devices 110 and 130 are driven by a common reference clock. However, it will be appreciated, that frequency mismatch between the devices can be introduced due defined values used by the PLLs of devices 110 and 120 using different to generate access clocks CK1 and CK2.

The reference clock module 210 includes registers 211, which can be used to condition the reference clock RCK with respect to its base clock BCK. For example, registers 211 can contain information that indicates a desired frequency, or multiplier/divisor values that will affect the frequency of RCK. Similarly, the PLL 111, which receives the signal RCK, comprises a frequency adjust module 221 connected to feedback logic 222. The frequency adjust module, which can be a voltage controlled oscillator or other signal adjusting device, receives a feedback signal from the feedback logic 222 that is compared to the reference clock RCK to set a frequency of CK1 relative the frequency of RCK. Registers 223 at feedback module 222 typically include a value that indicates the frequency relationship between RCK and the CK1. Access control module 112 includes access cycle generator 113 which can eliminate a pulses associated with a specific access cycle of CK1 that are identified for suppression or subtraction, or add back a pulse associated with a specific access cycle of CK1 identified for suppression. The signal ACK1 is used by access control module 112 to write data to the FIFO module 120.

The PLL 131 in FIG. 2 includes frequency adjust module 231, and feedback logic 232. The feedback logic module 232 includes registers 233. The PLL 131 operates in similar manner as PLL 111 previously described above. PLL 131 further generates access clock signal CK2, which is provided to the access control module 132, which in turn provides access signal ACK2 using access cycle generator 133 in a manner similar to that described with reference to the generation of signal ACK1 using access cycle generator 113.

Figure 3:
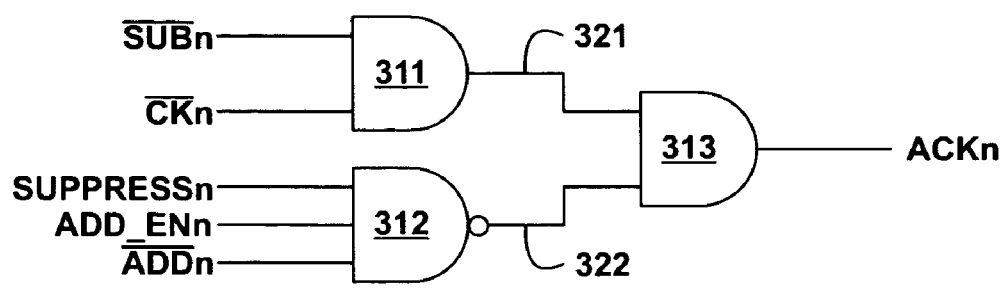
FIG. 3 illustrates a logic diagram of a portion of a device of FIG. 1 in accordance with a specific embodiment of the present disclosure.

FIG. 3 illustrates a specific logic implementation of a portion of access cycle generator 113 and 133 that generates the access signals ACK1 and ACK2 from their respective access clock signals. The implementation FIG. 3 can be used to suppress, add, and subtract access cycles at access signal ACK1 and ACK2. Operation of the logic diagram of FIG. 3 is discussed with reference to the timing diagram illustrated at FIG. 4.

Figure 4:
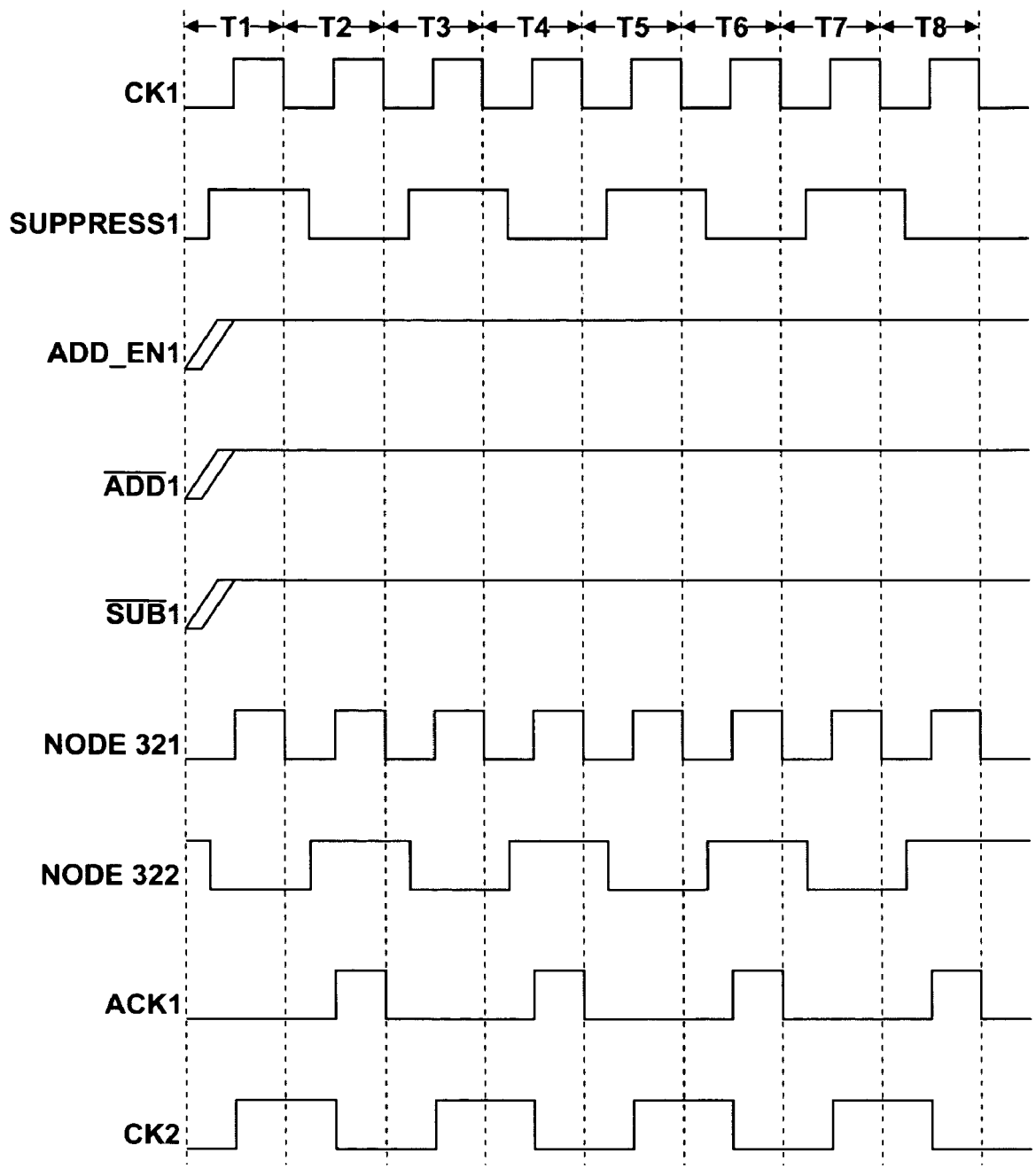
FIGS. 4, 5, and 7 illustrate signal waveforms in accordance with a specific embodiment of the present disclosure.

In accordance with a specific embodiment, the timing diagram of FIG. 4 indicates that the access clock CK1 has a frequency twice that of access clock CK2. With respect to the logic diagram of FIG. 3, the suffix "n" in FIG. 4 is equal to the integer 1. For example, CKn of FIG. 3 corresponds to CK1 of FIG. 4, which is received at the AND gate 310. In the embodiment illustrated, because it is access clock CK1 is faster than access clock CK2, a suppress signal labeled SUPPRESS1 in FIG. 4 is periodically asserted by the interface module 115, or other module, to effectively have a frequency of one-half the frequency of CK1 that can be used to suppress every other access cycle of the access clock CK1 at access signal ACK1.

The signal labeled ADD_EN1 in FIG. 3 is asserted by the interface device 115 to indicate that the signal SUPPRESS1 is being periodically asserted, thereby allowing access cycles identified for suppression to be added to access signal ACK1. Note that if SUPPRESS1 is never asserted, the number of access cycles at access signal ACK1 will match the number of access cycles at access clock CK1, thereby prohibiting the addition of further access cycles at ACK1.

Signals ADDB1 and SUBB1 in FIG. 4 are provided by interface module 115, and are both illustrated as negated in FIG. 4 to indicate that access cycles are being neither added nor subtracted from access signal ACK1 during the time illustrated in FIG. 4.

Referring to FIG. 3, signals SUBB1 and the CK1 are provided to the inputs of two input AND gate 311, which also has an output connected to node 321. FIG. 4 illustrates that the signal provided to node 321 from AND gate 311 contains the same access cycle information as CK1 in response to no SUBB1 signal being asserted, note that no ACK1 access cycles have been subtracted during the time period illustrated in FIG. 4. Signals SUPPRESS1, ADD_EN1 and ADDB1 are provided to inputs of the three input AND gate 312 having an output connected to node 322. In FIG. 4, ADD_EN1 is asserted to facilitate CK1 access cycles to be added to ACK1 by assertion of signal ADDB1. However, in FIG. 4, ADDB1 remains is negated indicating no access cycles are to be added during the illustrated time, while SUPPRESS1 is periodically asserted to suppress CK1 access cycles from having corresponding access cycles at access signal ACK1. Note that an inverted representation of the signal SUPPRESS1 is provided at node 322. Nodes 322 and 321 are connected to inputs of two-input AND gate 313 having an output that provides access signal ACK1. Based upon the signals at nodes 322 and 321, ACK1 is a representation of access clock CK1 having every other access cycle of access clock CK1. In this manner the number of access cycles available at ACK1 to write to the FIFO module 120 is reduced by one-half, as compared to the number of available CK1 access cycles. As a result, the number of available write cycles at ACK1 matches the number read cycles of ACK2 when no CK2 access cycles are suppressed at ACK2.

Figure 5:
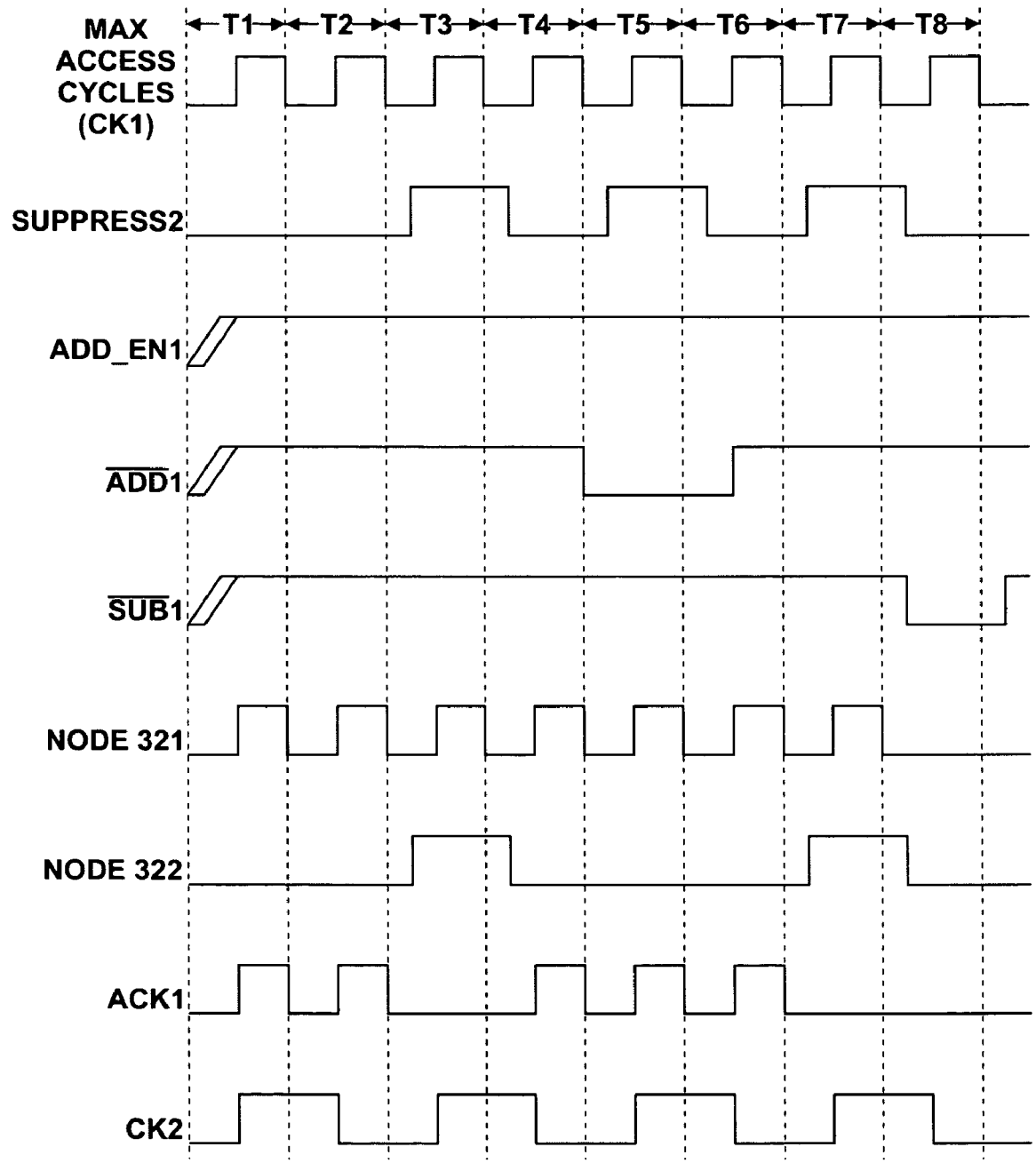

FIG. 5 illustrates a timing diagram having similar values for signals CK1, CK2, ADD_EN1 and SUPPRESS1 as illustrated and described with respect to FIG. 4. However, signal ADDB1 is asserted during the positive pulse of time T5 to illustrate the addition of an access cycle corresponding to time T5 at signal ACK1. Similarly, signal SUBB1 is asserted during the positive pulse of time T8 to illustrate removal (subtraction) of an access cycle corresponding to time T8 at signal ACK1.

In the illustrated embodiment, ADDB1 is asserted during a time that is coextensive with the positive pulse of CK1 at time T5 to prevent the asserted signal SUPPRESS1 from being propagated through AND gate 312 to node 322 during the positive pulse occurrence of CK1 at time T5, thereby allowing an access cycle that would have otherwise been suppresses at ACK1 to be added.

Similarly, signal SUBB1 being is asserted during a time that is coextensive with the positive pulse of CK1 at time T8 to illustrate removal of an access cycle at signal ACK1. The assertion of signal SUBB2 prevents the positive CK1 pulse at time T5 from being propagated through AND gate 311 to node 321, thereby allowing an access cycle to be removed at signal ACK1 during time T5 that would have otherwise occurred.

While FIG. 5 illustrates an embodiment where access cycles can be added or subtracted, it will be appreciated that in an alternate embodiment by allowing for the subtraction of access cycles from both of device 110 and device 130 the relative number of access cycles to the FIFO module 120 by the read and write devices can be regulated without the ability to add access cycles. For example, where the suppression of signals is not used, the ADD_EN signal can be negated at both devices to prevent attempts to add access cycles, or the logic can be modified to only support subtracting access cycles.

Figure 6:
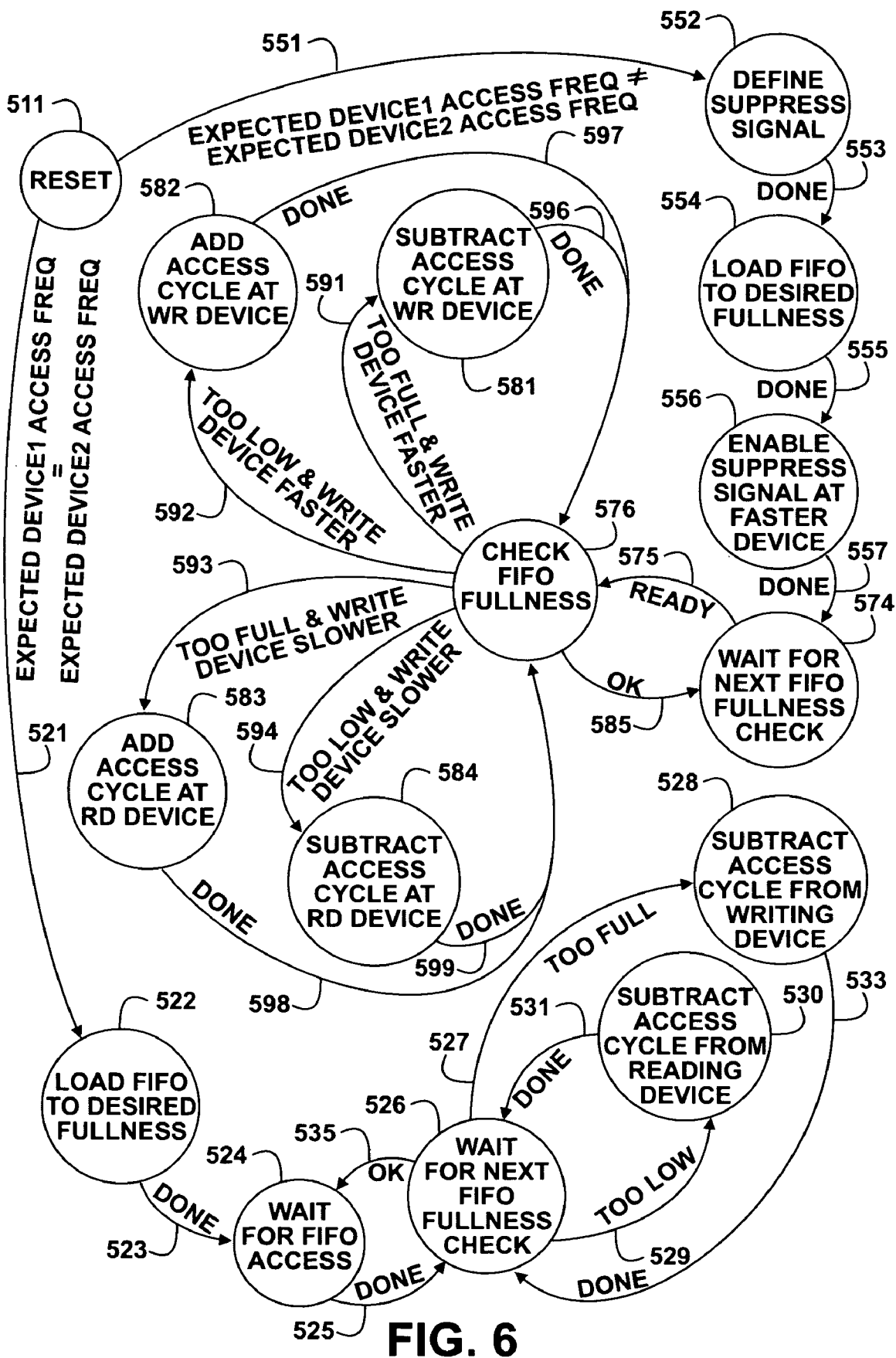
FIG. 6 illustrates a flow diagram in accordance with a specific embodiment of the present disclosure.

FIG. 6 illustrates a flow diagram illustrating operation of system device 100 in accordance with a specific embodiment. A reset of system device 100 occurs at node 511 during which a determination can be made to determine whether one of two devices accessing data through a common FIFO device has a faster expected access clock frequency. Path 521 is taken when the expected access clock frequencies of the two devices are determined to be the same, while path 551 is taken when the expected access clock frequencies of the two devices are not expected to be the same. It will be appreciated that in one embodiment that the access clock frequencies of the two devices can be determined based upon values stored at one or more register locations of system 100. For example, each device can have a register indicating its respective access clock frequency, or one or more registers containing information, such as an expected crystal frequency, reference clock frequency, and PLL multiplier information, that can be used to determine the expected access frequencies for each device.

In one embodiment, the expected access frequencies of the access devices are considered the same even when the system specification allows for variations in clock domain frequencies that would allow the frequency of access clock CK1 to be faster or slower than the frequency of access clock CK2. In another embodiment, the expected access frequencies of the access devices are considered the same even when the system specification requires the frequency one of the access clock CK1 or the access clock CK2 to always be faster than the other, provided that portion of the flow diagram accessed by path 521 can subtract access clock cycles (e.g., CK1 cycles) from its corresponding access signal (e.g. ACK1) at sufficient rate to compensate for all possible variations in clock domain frequencies.

Note that in one implementation of the present disclosure the use of that portion of the flow diagram of FIG. 6 that is accessed by path 551 does not need to be implemented at device 100, when it is possible to accommodate all possible frequency mismatches for a given system device specification through the use of that portion of the flow diagram of FIG. 6 accessed by the path 521, which presumes the access clock frequencies of the two devices are substantially the same, as discussed below.

For purposes of a first example, it is assumed that during operation data is being transferred from device 110 through FIFO module 120 to device 130, and that from reset node 511 path 521 is taken because the expected access clock frequency of a first device (e.g., CK1 in FIG. 1) is the same as the expected access clock frequency of the second device (e.g., CK2 in FIG. 1).

At node 522 the write access device loads the FIFO to a desired fullness by writing data to the FIFO. For purposes of example it is assumed that the desired fullness is of the FIFO device being accessed is a range of 2-4 entries, whereby the desired fullness is met when the number of entries at the FIFO device available to be read is within this range. While the writing device can provide to the FIFO device any number of entries at node 522 within the range of 2-4 entries, for purposes of example it is assumed that 3 entries have been loaded to the FIFO (see time T1 at FIG. 7). Path 523 is taken to transition to node 524 when the FIFO device is loaded to the desired fullness.

The system waits at node 524 until it is time to determine the fullness of the FIFO device. In one embodiment the fullness of the FIFO can be checked at each FIFO access. In another embodiment the fullness of the FIFO can be checked at every N accesses, where N is a defined number of accesses. For example, a FIFO fullness check can occur each time the head pointer of the FIFO wraps around by monitoring the most-significant bit of the write pointer. In high frequency systems, the change in frequency difference over time is typically to avoid clock duty cycle compression, therefore the frequency at which changes in frequency is detected can generally be less than for plesiochronous systems, where the tracking response time determines the maximum allowable mismatch between source clocks. Path 525 is taken from node 524 to node 526 in response determining it is time to perform a FIFO fullness check. For purposes of example herein, with respect to the timing diagram of FIG. 7, it is assumed the fullness is checked at every FIFO access.

Figure 7:
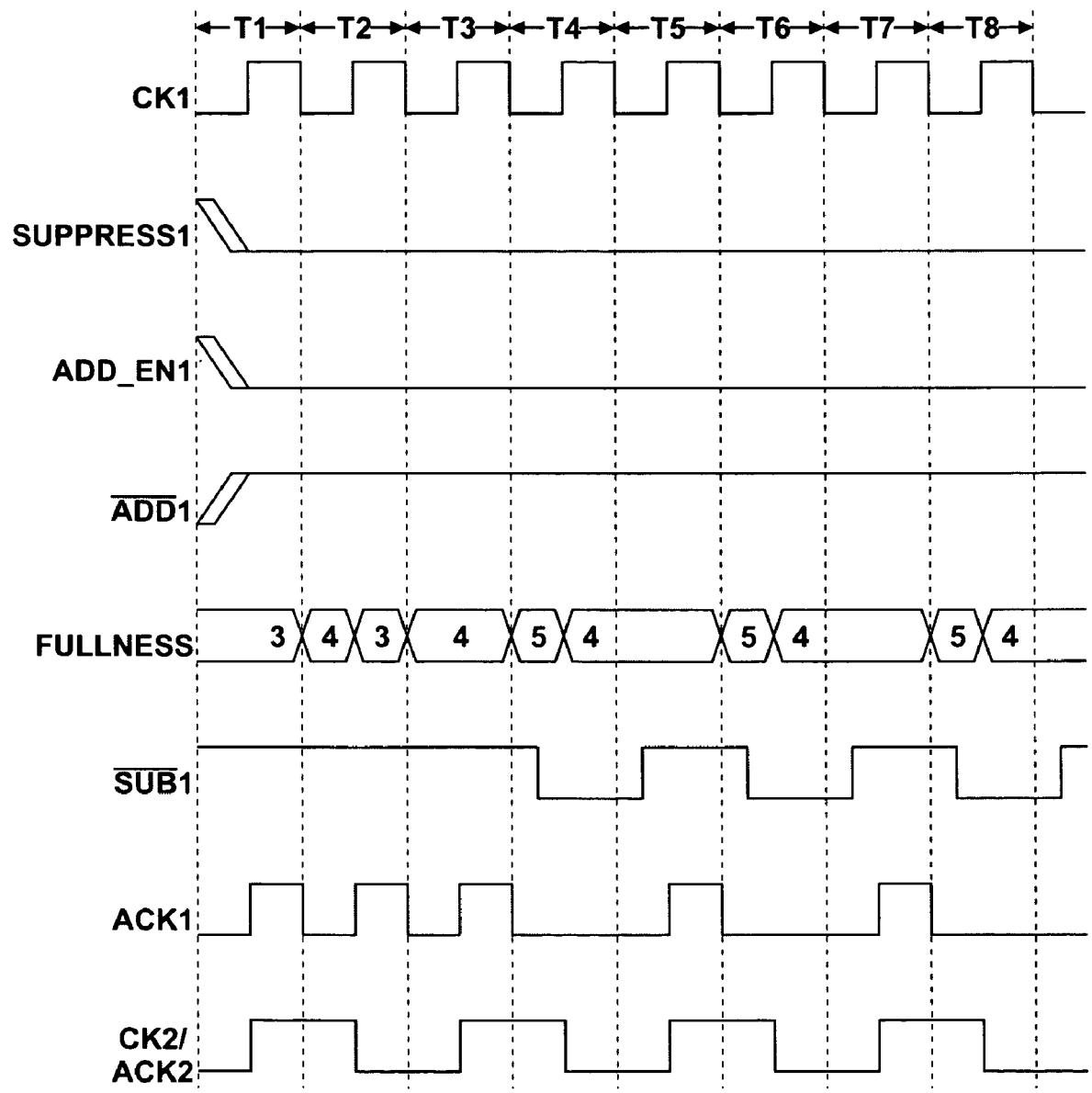

At node 526 the fullness of the FIFO device is checked. As previously discussed, the FIFO fullness can be checked by comparing the FIFO's head pointer to its tail pointer. In FIG. 7, the fullness of the FIFO is indicated at the signal labeled FULLNESS1. If the fullness of the FIFO device is OK, i.e., meets the desired fullness criteria, path 523 transitions control to node 525 to wait for a next FIFO fullness check. If it is determined at node 526 that the fullness of the FIFO device greater than the desired fullness criteria the FIFO device is considered too full and path 527 is taken to node 528. If it is determined at node 526 that the fullness of the FIFO device less than the desired fullness criteria the FIFO device is considered not full enough and path 529 is taken to node 530.

It will be appreciated that a frequency difference between ck1 and ck2 is detected over a period of time by monitoring the fullness of the FIFO device. By determining that the fullness of the FIFO device is greater than a desired fullness value it is determined that the access cycle frequency of the writing device access signal (e.g., ACK1) has increased relative to the access cycle frequency of the reading device. Table 1 indicates three access signal frequency change scenarios amongst devices accessing a common FIFO that can result in a FIFO fullness being greater than the desired fullness. Each scenario in Table 1 indicates whether the access signal frequencies (e.g., the number of access cycles at the access signal) of the read and write devices increased, decreased, or remained unchanged.

TABLE 1

| | FIFO Fullness > Desired Fullness | |
| --- | --- | --- |
| Scenario # | Write Device Access Signal Frequency | Read Device Access Signal Frequency |
| 1 | Increased | Unchanged |
| 2 | Unchanged | Decreased |
| 3 | Increased | Decreased |

At node 528, in response to determining the FIFO is fuller than the desired fullness, a write access cycle is subtracted from writing device's access signal (e.g., ACK1). By subtracting a write access cycle to the FIFO device from the writing device less data is stored at the FIFO device, allowing the reading device to catch up to the writing device. Note, that since no suppression is being used, it is not possible to add access cycles at this portion of the flow diagram.

By determining that the fullness of the FIFO device is less than a desired fullness value it is determined that the frequency of the writing device access signal has decreased relative to the access cycle frequency of the reading device. Table 2 indicates three frequency change scenarios amongst devices accessing a common FIFO that can result in a FIFO fullness being less than the desired fullness. Each scenario in Table 2 indicates whether the read and write devices' access signal frequencies increased, decreased, or remained unchanged.

TABLE 2

FIFO Fullness < Desired Fullness

| Scenario # | Write Device Access Frequency | Read Device Access Frequency |
|---|---|---|
| 1 | Unchanged | Increased |
| 2 | Decreased | Unchanged |
| 3 | Decreased | Increased |

At node 530, in response to determining the FIFO is less full than the desired fullness, a read access cycle is subtracted from the reading device's access signal (e.g., ACK2). By subtracting an access cycle from the reading device less data is removed from the FIFO device, allowing the writing device to catch up to the writing device.

By subtracting access cycles from the read and write devices in this manner it is possible to maintain a latency level based upon the desired fullness of the FIFO device. In one embodiment, the desired fullness of the FIFO device, and therefore the desired latency, can be stored at a register or other storage location to allow for programmability.

FIG. 7 illustrates a timing diagram discussed with reference to the flow diagram of FIG. 6 when path 521 is taken. For purposes of example, it is assumed that the frequency of the access clock (CK1) of the writing device is twice the frequency of the access clock (CK2) of the reading device. Application of the portion of flow diagram of FIG. 6 accessed by path 510 precludes assertion of signals SUPPRESS1, ADD_EN1, and ADDB1. Signal FULLNESS1 represents the number of entries at the FIFO device. The timing diagram of FIG. 7 is based upon an embodiment where the fullness value (FULLNESS) is updated at each negative edge of ACK1 and ACK2 (note that CK2 and ACK2 have the same number of access cycles in the present example). Therefore, at the end of time T1 the fullness of the FIFO device increases from 3 to 4 entries, which is within the desired range of 2-4 entries. An entry is removed from the FIFO device at the falling edge the ACK2 pulse that occurs at time T2 resulting in the fullness of the FIFO device decreasing from 4 to 3 entries. The next falling edge of ACK1 at time T2, however, adds an entry to the FIFO device resulting in the fullness of the FIFO returning to 4. Prior to the occurrence of another falling edge at ACK2 a rising edge occurs at ACK1 causing the FIFO fullness to be 5, which is outside the desired range. As a result, the signal SUBB1 is asserted, thereby causing the access pulse at time T4 of ACK1 to be removed (subtracted) from the access cycles of access signal ACK1 of the writing device to prevent the FIFO from receiving more than 5 entries. Continued application of the flow diagram portion of FIG. 6 accessed by path 521 results in every other access clock CK1 access cycles being subtracted from access signals ACK1.

It will be readily appreciated that if the reading device were twice as fast as the writing device that application of the flow diagram accessed by path 521 would result in every other CK2 access cycle being subtracted from the available read access cycles.

For purposes of a next example, it is assumed that during operation data is being transferred from a writing device to FIFO module 120 twice as fast as data is being received from a reading device (e.g., see FIG. 4), and that out of reset path 521 is taken due to the expected frequency difference between access clock CK1 and access clock CK2. Note that the specific embodiment of that portion of the flow diagram of FIG. 7 access by path 551 presumes that the system specification is such that either the reading device or the writing device will always be the faster access device. If it is possible for either the reading device or the writing device to be the faster device during operation then path 521 is taken.

At node 552, a suppress signal is defined for the writing device since it has the faster expected access rate. Referring to FIG. 4, the signal SUPPRESS1 is defined to remove every other access cycle of CK1 once the FIFO obtains a desired fullness. Note that the occurrence of suppression pulses of signal SUPPRESS1 can be determined at the interface module 125 based upon the expected frequency access clock cycle frequency difference, or at device 110.

Once the SUPPRESS1 signal is defined path 552 is take to node 554. At node 554 the FIFO is loaded to its desired fullness by the write device, after which path 554 is taken to node 556. At node 556 the suppress signal defined at path 552 is enabled at the device expected to be faster, thereby allowing suppression of every other CK1 access cycle at ACK1 to match the available number of access cycles at ACK2. In one embodiment, the signals labeled ACCESS CTL/DATA in FIG. 1 include the signal SUPPRESS1 being provided by the interface module 115 to device 110. In an alternate embodiment the signal SUPPRESS1 can be enabled to suppress access cycles prior to loading the FIFO device to the desired fullness at node 554. Path 557 transitions from node 556 to node 574.

A system executing the flow of FIG. 6 waits at node 574 until it is time to check the fullness of the FIFO device as previously discussed with respect to node 526. Flow proceeds to node 576, via path 575, in response to determining it is time for a next check of the FIFO fullness.

At node 576 the fullness of the FIFO device is checked. If the fullness of the FIFO device is OK, i.e., meets the desired fullness criteria, path 585 transitions control back to node 574 to wait for a next FIFO fullness check.

If it is determined at node 576 that the fullness of the FIFO device is too full and the write device is the faster device flow proceeds via path 591 to the node 581, where an access cycle is subtracted from the write device access signal (e.g., ACK1) before returning to node 576 via path 596. If it is determined at node 576 that the fullness of the FIFO device is too low (too few available entries at the FIFO device) and the write device is the faster device flow proceeds via path 592 to the node 582, where an access cycle is added to the write device access signal (e.g., ACK1) before returning to node 576 via path 597. If it is determined at node 576 that the fullness of the FIFO device is too full and the read device is the faster device flow proceeds via path 593 to the node 583, where an access cycle is added to the read device access signal (e.g., ACK1) before returning to node 576 via path 598. If it is determined at node 576 that the fullness of the FIFO device is too low and the read device is the faster device flow proceeds via path 594 to the node 584, where an access cycle is removed from the read device access signal (e.g., ACK2) before returning to node 576 via path 599. In this manner, access cycles are added and subtracted at the access signal of faster device to maintain a desired fullness of the FIFO device.

Figure 8:
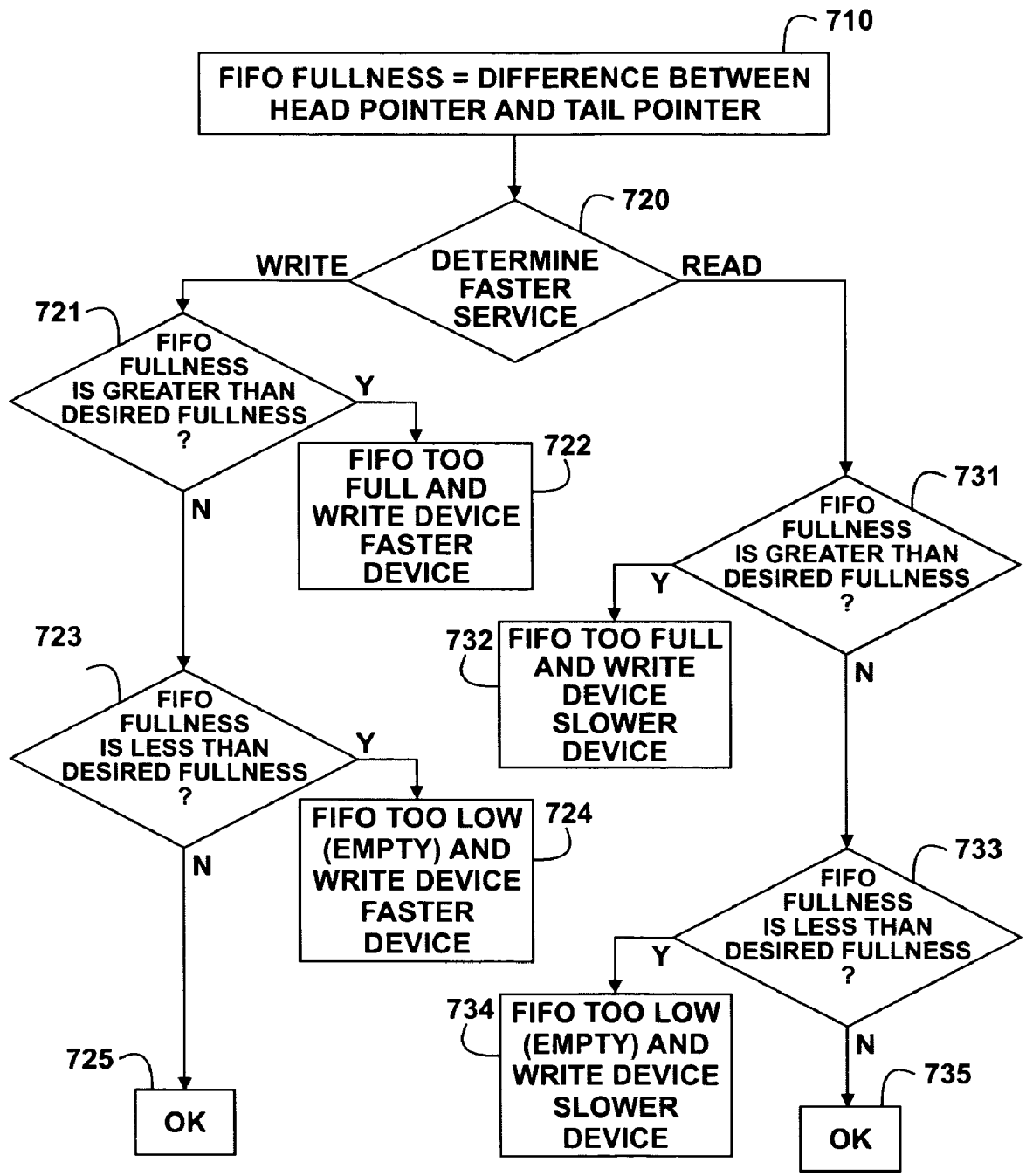
FIG. 8 illustrates a flow diagram associated with a portion of the flow diagram of FIG. 6 in accordance with a specific embodiment of the present disclosure.

FIG. 8 illustrates in flow diagram form a specific method of implementing node 576 of FIG. 6. At 710, the FIFO fullness is determined based upon the difference between a head pointer and a tail pointer. At 720 a determination is made which device is the faster device as implemented at node 556. When the write device is the faster device flow proceeds to 721. When the read device is the faster device (i.e., the write device is the slower device) flow proceeds to 732.

At 721 it is determined whether the FIFO fullness is greater than the desired fullness. As discussed previously, determining whether the FIFO is currently too full can be based upon one or more recent fullness values. The flow proceeds to 722 to indicate the FIFO is too full and the write device is faster when it is determined at 721 that the FIFO is too full. Otherwise flow proceeds to 723 where it is determined whether the FIFO fullness is lower than the desired fullness. The flow proceeds to 724 to indicate the FIFO is too low and the write device is faster when it is determined at 722 that the FIFO fullness is too low. Otherwise the flow proceeds to 725 where the FIFO fullness is identified as OK.

At 731 it is determined whether the FIFO fullness is greater than the desired fullness. As discussed previously, determining whether the FIFO is currently too full can be based upon one or more recent fullness values. The flow proceeds to 732 to indicate the FIFO is too full and the write device is slower when it is determined at 731 that the FIFO is too full. Otherwise flow proceeds to 733 where it is determined whether the FIFO fullness is lower than the desired fullness. The flow proceeds to 734 to indicate the FIFO is too low and the write device is slower when it is determined at 722 that the FIFO fullness is too low. Otherwise the flow proceeds to 735 where the FIFO fullness is identified as OK.

Figure 9:
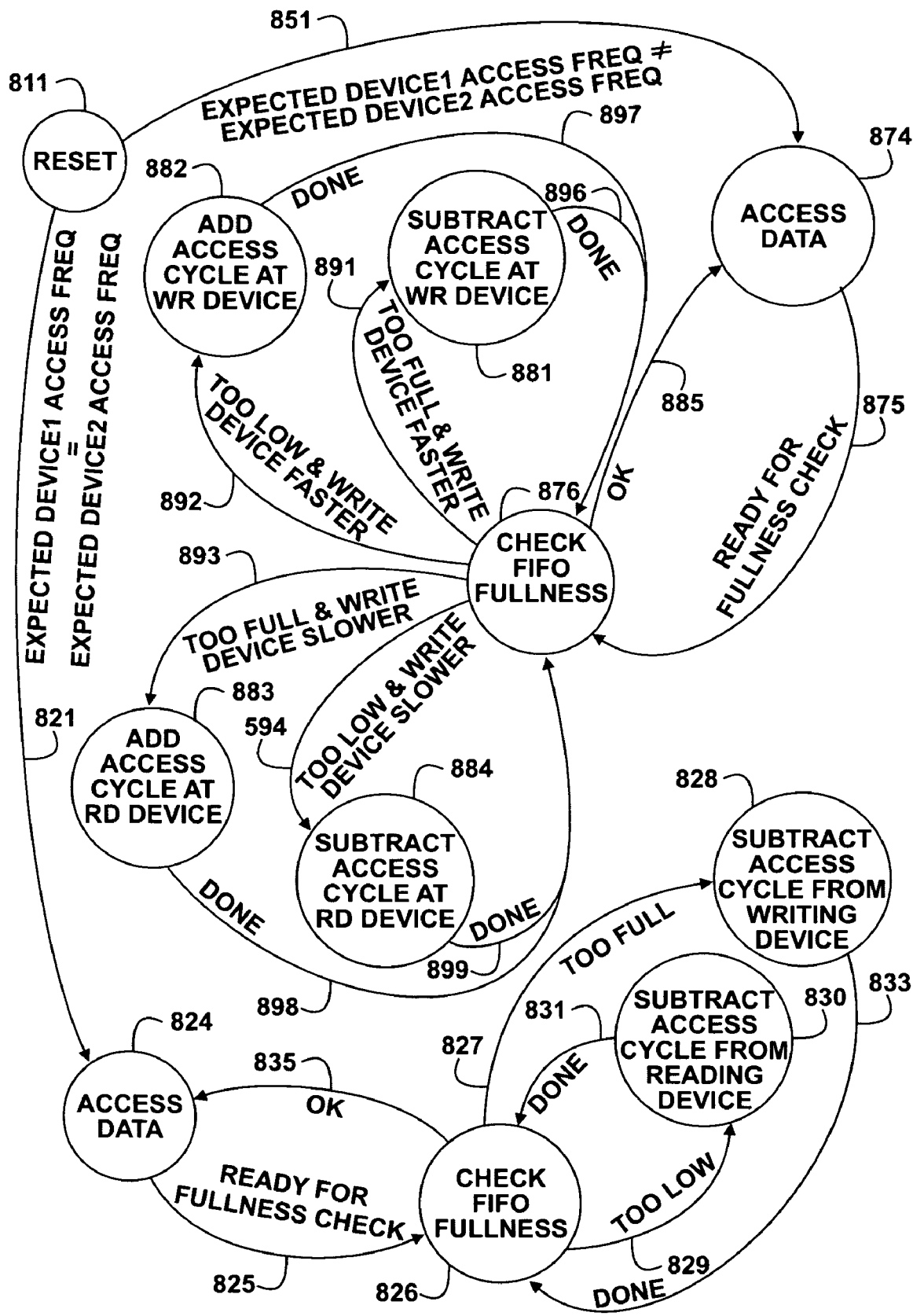
FIG. 9 illustrates a flow diagram in accordance with a specific embodiment of the present disclosure.

FIG. 9 illustrates a flow diagram illustrating operation of system device 100 in accordance with another embodiment. A reset of system device 100 occurs at node 811 during which a determination can be made to determine whether one of two devices accessing data through a common FIFO device has a faster expected access clock frequency. As previously discussed with respect to paths 521 and 581 of FIG. 6, path 821 is taken when the expected access clock frequencies of the two devices are determined to be the same, while path 851 is taken when the expected access clock frequencies of the two devices are not expected to be the same. In the present embodiment, the FIFO is loaded with dummy data during reset, which when read by a target device is discarded. Also during reset the dummy data is read from the FIFO until the FIFO is operating within its desired fullness. Defining and enabling suppression, as previously discussed with respect to nodes 552 and 556 of FIG. 6 is accomplished during reset as needed in the embodiment of FIG. 9.

When the expected access frequencies are considered the same, flow proceeds to node 824 where data is read from, and written to, the FIFO device at each respective read access cycle and write access cycle. In the event the writing device has no real data to transfer to the reading device dummy data will be written. The reading device will discard dummy data read from the FIFO. When a system state indicates that it is time to check the fullness of the FIFO flow proceeds to node 826 where the FIFO fullness check is performed. If the fullness of the FIFO is OK flow proceeds back to node 824. Otherwise flow proceeds to one of nodes 830 and 828 in a manner consistent with the previous discussions regarding nodes 530 and 528, respectively.

When the expected access frequencies are considered the different, flow proceeds to node 874 where data is read from, and written to, the FIFO device at each respective read access cycle and write access cycle. In the event the writing device has no real data to transfer to the reading device dummy data will be written. The reading device will discard dummy data read from the FIFO. When a system state indicates that it is time to check the fullness of the FIFO flow proceeds to node 876 where the FIFO fullness check is performed. If the fullness of the FIFO is OK flow proceeds back to node 824. Otherwise flow proceeds to one of nodes 881-884 in a manner consistent with the previous discussions regarding nodes 581-584, respectively.

Figure 10:
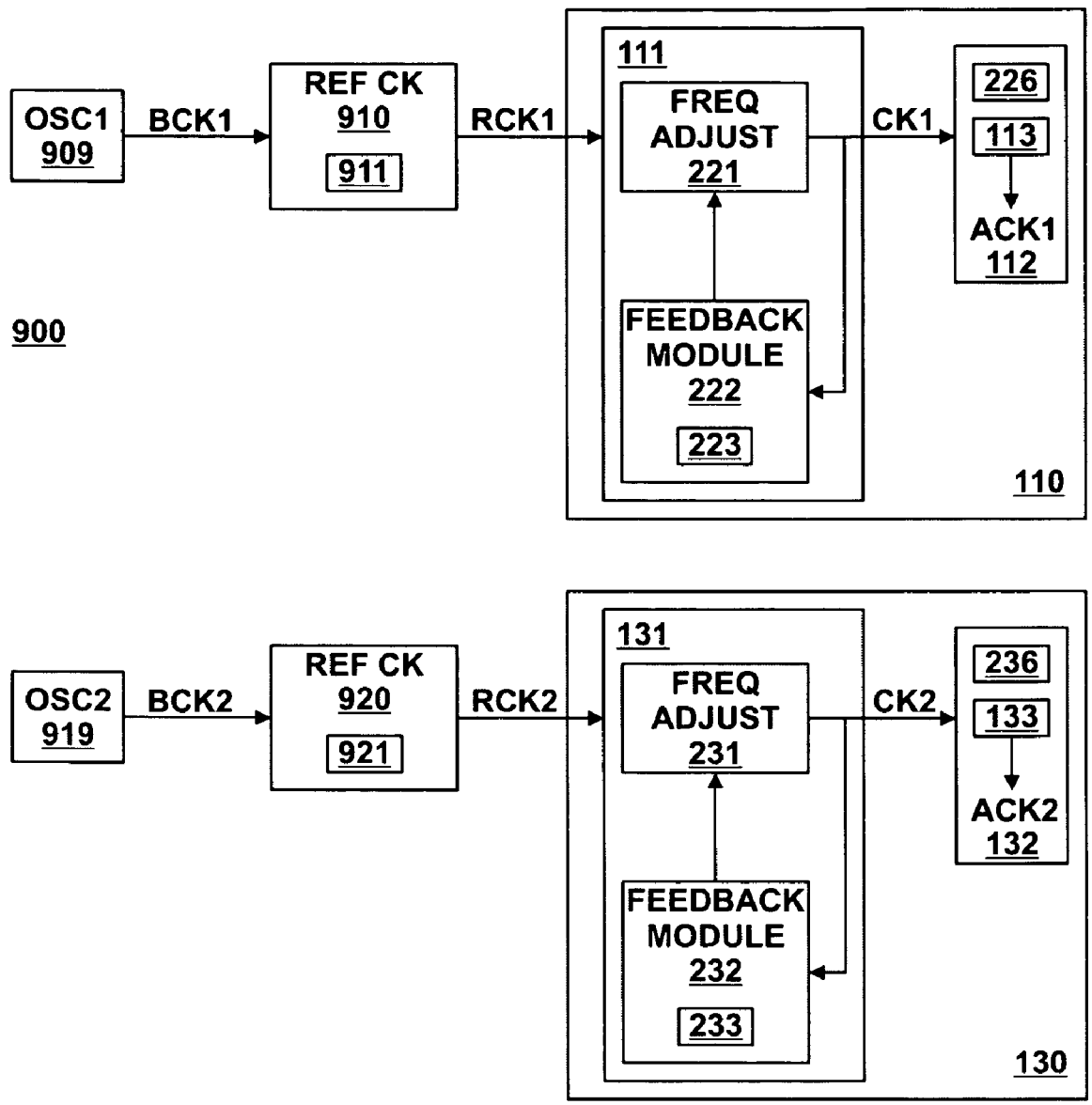
FIG. 10 illustrates in block diagram form a portion of the devices of FIG. 1 being driven by different clock reference signals in accordance with a specific embodiment of the present disclosure.

FIG. 10 illustrates a specific embodiment of a system 900 illustrating in greater detail devices 110 and 130, and further illustrating a reference clock module 910 that receives a base clock, labeled BCK1 from oscillator 909, from which it generates and provides a reference clock, labeled RCK1, to PLL 111 of device 110. FIG. 10 further illustrates a reference clock module 920 that receives a base clock, labeled BCK2 from oscillator 919, from which it generates and provides a reference clock, labeled RCK2, to PLL 111 of device 110. The frequency of base clock BCK1 and BCK2 can nominally the same or different as set by their respective oscillators. Their will likely be a frequency mismatch between devices 110 and 130 due to reference clock variations in the embodiment of FIG. 2 since both devices 110 and 130 are driven by a different reference clocks.

The preceding detailed description has described a method of accessing data and that in the preceding detailed description, reference has been made to the accompanying drawings that form a part hereof, and in which are shown by way of illustration specific embodiments in which the invention may be practiced. In accordance with a first embodiment, a first access clock, such as CK1, is received at a first clock domain to provide first periodic First In First Out memory (FIFO) access cycles at a first rate, wherein a FIFO access cycle is a portion of a signal comprising one or more transitions for controlling an access to a FIFO. A first access signal is generated comprising first available access cycles corresponding to at least a portion of the periodic first FIFO access cycles. A second access clock is received at a second clock domain to provide second periodic FIFO access cycles at a second rate. A second access signal is generated comprising second available access cycles corresponding to at least a portion of the periodic second FIFO access cycles. Data from the first device is transferred to the second device through the FIFO in response to the first access signal and the second access signal. A frequency difference is determined between the first rate and the second rate in response to a fullness of the FIFO being outside a desired range, wherein the desired range indicates a fullness of the FIFO that is less than full and more than empty. A number of access cycles is adjusted at least one of the first access signal and the second access signal in response to determining the frequency difference being outside the desired range. The first embodiment can include determining whether the first access clock or the second access clock is a faster access clock based upon the first rate and the second rate, and adjusting further comprises the at least one of the first access clock and the second access clock being the determined faster access clock.

Adjusting as described in the first embodiment can further include adjusting further comprises subtracting a periodic first FIFO access cycle from the first access signal in response to the first access clock being the faster access clock, and subtracting a periodic second FIFO access cycle from the second access signal in response to the second access clock being the faster access clock.

Adjusting as described in the first embodiment can further include adding a periodic first FIFO access cycle to the first access signal in response to the second access clock being the faster access clock, and adding a periodic second FIFO access cycle to the second access signal in response to the first access clock being the faster access clock; identifying a portion of the first periodic FIFO access cycles to be suppressed, wherein the portion is based upon the total number of expected access cycles at the first access clock and the total number of expected access cycles at the second access clock; wherein determining whether the first access clock or the second access clock is the faster access clock is based upon stored information indicative of a frequency of the first access clock and a frequency of the second access clock.

Determining whether the first access clock or the second access clock is the faster access clock is based upon stored information indicative of a frequency of the first access clock and the second access clock is also used in accordance with a specific embodiment.

The first embodiment can include determining whether the first access clock and the second access clock have substantially the same expected frequency, wherein the first access clock and the second access clock have substantially the same expected frequency when a difference between an expected frequency of the first access clock and an expected frequency of the second access clock is within a defined range, wherein adjusting further comprises reducing the number of available access cycles to the FIFO at one of the first access signal or the second access signal in response to determining the first access clock and the second access clock have substantially the same expected frequency, and wherein adjusting further comprises reducing the number of first available access cycles at the first access signal in response to the frequency difference causing more periodic first access cycles at the first access signal than periodic second access cycles at the second access signal, and reducing the number of access signals at the second device in response to the frequency difference causing fewer periodic first access cycles at the first access signal than periodic second access cycles at the second access signal.

The first embodiment can include adjusting further comprising reducing the number of first available access cycles at the first device in response to the frequency difference causing more first available access cycles at the first access signal than second available access cycles at the second access signal, and reducing the number of second available access cycles at the second access signal in response to the frequency difference causing fewer first available access cycles at the first access signal than second available access cycles at the second access signal.

In accordance with a second embodiment, a first signal is asserted in response to detecting a frequency difference between two clock domains to correspond to a first asserted access cycle of a second signal; a third signal is generated comprising asserted access cycles based on asserted access cycles of the second signal and a negated access cycle based on the asserted first signal, wherein the negated access cycle corresponds to the first asserted access cycle; and a memory is accessed during asserted access cycles of the second access signal, and not accessing the memory during negated access cycles of the second access signal. In response to detecting the frequency difference between two clock domains, a fourth signal corresponding to the first asserted access cycle, and generating further includes generating the third signal comprising an asserted access cycle corresponding to the first asserted access cycle in response to the asserted fourth signal.

In one embodiment the first signal is a suppression signal and the frequency difference is an expected frequency difference, wherein asserting the first signal further comprises asserting, in response to a variation of the expected frequency difference between the two clock domains, a second signal corresponding to the first asserted access cycle.

These embodiments and certain variants thereof, have been described in sufficient detail to enable those skilled in the art to practice the invention. It is to be understood that other suitable embodiments may be utilized and that logical, changes may be made without departing from the spirit or scope of the invention. In addition, it will be appreciated that the functional blocks shown in the figures could be further combined or divided in a number of manners without departing from the spirit or scope of the invention. The preceding detailed description is, therefore, not intended to be limited to the specific forms set forth herein, but on the contrary, it is intended to cover such alternatives, modifications, and equivalents, as can be reasonably included within the spirit and scope of the appended claims. For example, to optimize performance of the design, calculation relating to FIFO fullness and suppression of access cycles can be done in the faster clock domain, and allowing the pointer in the slow domain to essentially free run. When one domain cannot be guaranteed to be the fast domain frequency tracking logic can be available in both domains to handle the calculations. Also, since the phase relationship of the clock domains can be close, but distinctly different, the affects of the slowly changing phase relationship between this signals can be mitigated by ensuring that sampling occurs over the entire range of possible phase relationships of the signals.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

What is claimed is:

1. A method comprising:

receiving a first access clock at a first clock domain to provide periodic first First In First Out memory (FIFO) access cycles at a first frequency, wherein a FIFO access cycle is a portion of a signal comprising one or more transitions for controlling an access to a FIFO;

generating a first access signal comprising available first FIFO access cycles corresponding to at least a portion of the periodic first FIFO access cycles, the available first FIFO access cycles having a first frequency that is the same frequency as the periodic first FIFO access cycles;

receiving a second access clock at a second clock domain to provide periodic second FIFO access cycles at a second frequency;

generating a second access signal comprising available second FIFO access cycles corresponding to at least a portion of the periodic second FIFO access cycles, the available second FIFO access cycles having the same frequency as the periodic second FIFO access cycles;

transferring data from the first clock domain to the second clock domain through the FIFO in response to a number of the available first FIFO access cycles and a number of the available second FIFO access cycles; and determining, in response to a fullness of the FIFO being outside a desired range, that a difference has occurred between the number of available first FIFO access cycles transferring the data and the number of available second FIFO access cycles transferring the data; and modifying generation of the first access signal, without changing the frequency of the first or second periodic FIFO access cycles, by subtracting a periodic first FIFO access cycle from the available first FIFO access cycles in response to the difference indicating a greater number of available first FIFO access cycles.

2. The method of claim 1, further comprising:
determining whether the first access clock or the second access clock is a faster access clock based upon the first frequency and the second frequency.

3. The method of claim 2, wherein determining whether the first access clock or the second access clock is the faster access clock is based upon stored information indicative of a frequency of the first access clock and a frequency of the second access clock.

4. The method of claim 1 further comprising,
determining whether the first access clock or the second access clock is a faster access clock based upon stored information indicative of a frequency of the first access clock and a frequency of the second access clock.

5. A method comprising:
receiving a first access clock at a first clock domain to provide periodic first First In First Out memory (FIFO) access cycles at a first frequency, wherein a FIFO access cycle is a portion of a signal comprising one or more transitions for controlling an access to a FIFO;
generating a first access signal comprising available first FIFO access cycles corresponding to at least a portion of the periodic first FIFO access cycles the available first FIFO access cycles having a first frequency that is the same frequency as the periodic first FIFO access cycles;
receiving a second access clock at a second clock domain to provide periodic second FIFO access cycles at a second frequency;
generating a second access signal comprising available second FIFO access cycles corresponding to at least a portion of the periodic second FIFO access cycles, the available second FIFO access cycles having the same frequency as the periodic second FIFO access cycles;
transferring data from the first clock domain to the second clock domain through the FIFO in response to a number of the available first FIFO access cycles and a number of the available second FIFO access cycles;
determining, in response to a fullness of the FIFO being outside a desired range, that a difference has occurred between the number of available first FIFO access cycles transferring the data and the number of available second FIFO access cycles transferring the data; and
modifying generation of the first access signal, without changing the frequency of the first or second periodic FIFO access cycles, by adding a periodic first FIFO access cycle to the available first FIFO access cycles in response to the difference indicating a smaller number of available first FIFO access cycles.

6. The method of claim 5, further comprising:
determining whether the first access clock or the second access clock is a faster access clock based upon the first frequency and the second frequency.

7. The method of claim 6, wherein determining whether the first access clock or the second access clock is the faster access clock is based upon stored information indicative of a frequency of the first access clock and a frequency of the second access clock.

8. The method of claim 5, wherein determining whether the first access clock or the second access clock is the faster access clock is based upon stored information indicative of a frequency of the first access clock and a frequency of the second access clock.

9. A method comprising:
receiving a first-access clock at a first clock domain to provide periodic first First In First Out memory (FIFO) access cycles at a first frequency, wherein a FIFO access cycle is a portion of a signal comprising one or more transitions for controlling an access to a FIFO;
generating a first access signal comprising available first FIFO access cycles corresponding to at least a portion of the periodic first FIFO access cycles the available first FIFO access cycles having a first frequency that is the same frequency as the periodic first FIFO access cycles;
receiving a second access clock at a second clock domain to provide periodic second FIFO access cycles at a second frequency;
generating a second access signal comprising available second FIFO access cycles corresponding to at least a portion of the periodic second FIFO access cycles, the available second FIFO access cycles having the same frequency as the periodic second FIFO access cycles;
transferring data from the first clock domain to the second clock domain through the FIFO in response to a number of the available first FIFO access cycles and a number of the available second FIFO access cycles;
determining, in response to a fullness of the FIFO being outside a desired range, that a difference has occurred between the number of available first FIFO access cycles transferring the data and the number of available second FIFO access cycles transferring the data; and
modifying generation of the first access signal, without changing the frequency of the first or second periodic FIFO access cycles, by adjusting a number of available FIFO access cycles at least one of the first access signal and the second access signal in response to determining the difference occurred.

10. The method of claim 9, further comprising:
determining whether the first access clock or the second access clock is a faster access clock based upon the first frequency and the second frequency; and
wherein adjusting further comprises the at least one of the first access clock and the second access clock being the determined faster access clock.

11. The method of claim 10, wherein adjusting further comprises subtracting a available first FIFO access cycle from the first access signal in response to the first access clock being the faster access clock, and subtracting a available second FIFO access cycle from the second access signal in response to the second access clock being the faster access clock.

12. The method of claim 10, wherein adjusting further comprises adding a available first FIFO access cycle to the first access signal in response to the second access clock being the faster access clock, and adding a available second FIFO access cycle to the second access signal in response to the first access clock being the faster access clock.

13. The method of claim 12, wherein determining whether the first access clock or the second access clock is the faster access clock is based upon stored information indicative of a frequency of the first access clock and a frequency of the second access clock.

14. The method of claim 10, wherein determining whether the first access clock or the second access clock is the faster access clock is based upon stored information indicative of a frequency of the first access clock and a frequency of the second access clock.

15. The method of claim 9, further comprising:
determining whether the first access clock and the second access clock have substantially the same expected frequency, wherein the first access clock and the second access clock have substantially the same expected frequency when a difference between an expected frequency of the first access clock and an expected frequency of the second access clock is within a defined range; and
wherein adjusting further comprises reducing the number of available FIFO access cycles to the FIFO at at least one of the first access signal and the second access signal in response to determining the first access clock and the second access clock have substantially the same expected frequency.

16. The method of claim 15, wherein adjusting further comprises reducing the number of available first FIFO access cycles at the first access signal in response to a frequency difference between the first access clock and the second access clock causing more periodic first FIFO access cycles than period second FIFO access cycles.

17. The method of claim 9, wherein adjusting further comprises reducing the number of available first FIFO access cycles at the first access signal in response to a frequency difference between the first access clock and the second access clock causing more periodic first FIFO access cycles than periodic second FIFO access cycles.

18. The method of claim 17, wherein the first access signal provides write access timing for writing to the FIFO.

19. The method of claim 17, wherein the first access signal provides read access timing for reading from the FIFO.

* * * * *